United States Patent [19]
Diehl

[11] Patent Number: 5,274,786
[45] Date of Patent: Dec. 28, 1993

[54] MICROPROCESSOR MEMORY BUS INTERFACE FOR INHIBITING RELATCHING OF ROW ADDRESS PORTIONS UPON SUBSEQUENT ACCESSES INCLUDING A SAME ROW ADDRESS PORTION

[75] Inventor: Michael R. Diehl, Fort Collins, Colo.

[73] Assignee: Hewlett-Packard Company, Palo Alto, Calif.

[21] Appl. No.: 619,279

[22] Filed: Nov. 28, 1990

[51] Int. Cl.⁵ .............................................. G06F 12/00
[52] U.S. Cl. .................................. 395/425; 395/800; 395/500; 364/239.3; 364/254.2; 364/927.97; 364/927.5; 364/968; 364/968.1; 364/DIG. 2
[58] Field of Search ................ 395/425, 400, 800, 500

[56] References Cited

U.S. PATENT DOCUMENTS

| | | | |
|---|---|---|---|
| 4,546,451 | 10/1985 | Bruce | 395/425 |
| 4,587,629 | 5/1986 | Dill et al. | 395/425 |
| 4,649,511 | 3/1987 | Gdula | 395/425 |
| 4,701,843 | 10/1987 | Cohen | 395/425 |
| 4,803,621 | 2/1989 | Kelly | 395/400 |
| 4,831,514 | 5/1989 | Turlakov et al. | 395/500 |
| 4,847,758 | 7/1989 | Olson et al. | 395/425 |
| 4,924,375 | 5/1990 | Fung et al. | 395/425 |
| 4,937,791 | 6/1990 | Steele et al. | 365/230.03 |
| 5,034,917 | 7/1991 | Bland et al. | 395/425 |
| 5,134,699 | 7/1992 | Aria et al. | 395/425 |

Primary Examiner—Thomas C. Lee
Assistant Examiner—Paul Harrity

[57] ABSTRACT

An interface unit which can reduce the hardware cost by interfacing a microprocessor with an inexpensive memory device with a smaller word size without compromising the overall performance. The current invention improves the overall performance of the interface system by reducing the overhead address relatching without adding expensive and sophisticated pieces of hardware. This is accomplished by comparing a row address portion of the current address with that of the previous address. When a current address contains the same row address as the previously accessed memory-page, the current invention saves clock cycles by avoiding relatching of the row address portion of the address in the memory device. Such saving is significant when contiguous addresses are sequentially accessed.

13 Claims, 3 Drawing Sheets

MICROPROCESSOR MEMORY BUS INTERFACE FOR INHIBITING RELATCHING OF ROW ADDRESS PORTIONS UPON SUBSEQUENT ACCESSES INCLUDING A SAME ROW ADDRESS PORTION

BACKGROUND OF THE INVENTION

1. Field of the Invention

The present invention relates to a microprocessor memory bus interface, and more particularly, to an interface which minimizes the amount of address latching so as to save clock cycles during memory data transfer.

2. Description of the Prior Art

Interfacing a microprocessor with a memory device is accomplished in a number of ways. Special interfacing techniques have been developed in the prior art when the microprocessor and memory device have different addressable data sizes. For example, a 32-bit word microprocessor is interfaced with 16-bit word memory chips in an IBM PC by performing two memory accesses to the 16-bit memory and forming a 32-bit data word acceptable to the microprocessor. One of the benefits of such an interface is that hardware cost is reduced since the number of dynamic random access memory chips is reduced. However, the overall performance of the computer usually suffers as a result of the reduced hardware support.

A decline in the overall performance is generally caused by increased overhead tasks. In the above-mentioned system, the interface has to coordinate extra intermediate steps that do not exist where the same task is directly accomplished. For example, the microprocessor of the aforementioned system thinks that it is writing a 32-bit word at a single address in the memory device. However, since the interface has to write the data at two memory addresses in the 16-bit addressable memory device, the interface has to temporarily hold the 32-bit word before writing two 16-bit words at adjacent memory addresses in the memory device. As a result, one write operation to the microprocessor is actually two write operations to the interface, and the coordination of such write operations requires a controller to handle the overhead. Similarly, during a read operation, a 32-bit word is read from two 16-bit words in the memory device. The two 16-bit words are sequentially read from the temporary media and must be held until the microprocessor can simultaneously read them. Again, the coordination of sequential read operations requires some overhead.

FIG. 1 illustrates a prior art microprocessor 100 interfaced with a memory device 102 whose addressable data size is smaller than that of the microprocessor 100. For example, the microprocessor 100 may be a 64-bit INTEL i860 microprocessor, while the memory device 102 may be a 32-bit DRAM (Dynamic Random Access Memory). The interface comprising transceivers 104 and 106 and control device 108 makes the 32-bit DRAM 102 appear to microprocessor 100 as a sequence of 64-bit wide locations by packing two 32-bit words into one 64-bit word for i860 reads from transceivers 104 and 106 and unpacking one 64-bit word into two 32-bit words of transceivers 104 and 106 for i860 writes. The packing and unpacking is controlled by control device 108.

Control device 108 controls packing and unpacking by asserting a variety of signals: LtchBA latches the data from microprocessor 100 to transceivers 104 and 106 on its rising edge; nLOEBA enables lower transceivers 106 to drive their contents onto the data bus connecting to memory device 102; nUOEBA enables upper transceivers 104 to drive their contents onto the data bus connecting to memory device 102; UWdLtch latches the data from memory device 102 to upper transceivers 104 on its rising edge; LWdLtch latches the data from memory device 102 to lower transceivers 106 on its rising edge; and OEAB enables both lower and upper transceivers 106 and 104 to drive their contents onto the data bus connecting to microprocessor 100.

During i860 write cycles, control device 108 asserts the following signals. IData[63:0] is latched to transceivers 104 and 106 on the rising edge of LtchBA. As a result, the upper transceivers 104 hold the data bits 32 through 63, while the lower transceivers 106 hold the data bits 0 through 31. nLOEBA is then asserted causing the lower transceivers 106 to drive IData[31:0] onto XData[31:0]. A DRAM write cycle is then initiated which writes XData[31:0] to the lower (IAddr[2]=0) DRAM address. Then after nLOEBA has been negated long enough to avoid bus contention between upper and lower transceivers 104 and 106, nUOEBA is asserted allowing the upper transceivers 104 to drive IData[63:32] onto XData[31:0]. A DRAM write cycle is then initiated which writes XData[31:0] to the upper (IAddr[2]=1) DRAM address.

During i860 read cycles, control device 108 asserts the following signals. XData[31:0] is latched into the lower transceivers 106 on the rising edge of LWdLtch. When the data from the next address (IAddr[2]=1) is valid on XData[31:0], it is latched into the upper transceivers 104 on the rising edge of UWdLtch. Both lower and upper transceivers are then enabled, by asserting OEAB, driving data onto IData[63:0], which is then read by the i860.

Overhead tasks also include the coordination of address latching. Although not shown in FIG. 1, the generated address is first latched in an address latch. Since the accesses are 32-bits wide, only address bits 19 through 2 need to be used, and accordingly, address bit 2 must be generated to compensate for a one-bit address shift in the address latch. The address is then relatched in the memory device 102 before data in the memory device 102 is finally accessed. Therefore, an address must be latched twice for each read and write operation. It is desired to minimize some of this excess address latching so that some processing cycles may be saved during memory access.

A need thus exists for an interface unit which can reduce the hardware cost by interfacing a microprocessor with an inexpensive memory device with a smaller word size without compromising the overall performance. One object of the current invention is to improve the overall performance of the interface system by reducing the overhead address relatch described above without adding expensive and sophisticated pieces of hardware. The present invention fulfills these objects.

SUMMARY OF THE INVENTION

The invention provides an apparatus and a method which minimize address latching so as to save clock cycles in an interface between a microprocessor and a memory device. By so reducing the number of address latches necessary, overhead may be reduced.

According to one embodiment of the invention, an interface is provided for interfacing a microprocessor with a memory device. Such an interface in accordance with a preferred embodiment of the invention comprises means for latching addresses from the microprocessor to the memory device, a first address bus connecting the microprocessor with the address latching means, and a second address bus connecting the address latching means and the memory device. The interface of the invention is characterized by means responsive to an input signal and at least a portion of the address from the microprocessor for determining whether a current address in the memory device is on the same page as a previous address in the memory device which is already latched by the address latching means and for preventing relatching of at least a portion of the address when the current address and previous address are on the same page.

According to another embodiment of the invention, the microprocessor is interfaced with a memory device whose addressable data size is smaller than that of the microprocessor. During each read and write operation for such an embodiment, an address is latched in the address latch, while the data is held in a plurality of transceivers that have the same data size as that of the memory device. A control device saves clock cycles by eliminating relatching of a row address portion of the address in the memory device when the current address contains the same row address as a previous address. The control device also preferably controls the data bus access among the microprocessor, transceivers and memory device.

According to yet another embodiment of the invention, the control device comprises a same memory-page comparator and controller which receive a signal from the microprocessor indicating that a row address portion of the current address is the same as that of the previous address and a signal giving the status of a particular bit of the current address. The microprocessor does not compare this bit; instead, the memory device uses this bit as a part of the row address. When these two signals indicate that the current address resides in the previously accessed memory-page, the current invention saves clock cycles by avoiding relatching of the row address portion of the address in the memory device.

The scope of the invention further includes a method for interfacing a microprocessor with a memory device. In accordance with such a method, writing data to and reading data from the memory device for processing by the microprocessor comprises the steps of:

(a) enabling access to a first data bus connecting the microprocessor to first and second transceivers, the transceivers holding data during transfer between the microprocessor and the memory device;

(b) respectively transferring data from the microprocessor to the first and second transceivers;

(c) latching an address to the memory device where data is to be written;

(d) determining if a current address is within a memory page which is accessed in a previous bus cycle by comparing a row address portion of the current address and that of a previously accessed address in the microprocessor and generating a same row signal if the current address is within the memory page;

(e) avoiding relatching of previously accessed row address portions of the address signal in the memory device during the latching step;

(f) sequentially enabling access to a second data bus from the first and second transceivers to the memory device to write data stored in each transceiver at adjacent memory locations while disabling access to the second data bus by the other transceiver during a write operation;

(g) latching an address to the memory device where data in the memory device is to be read from;

(h) repeating steps (d) and (e);

(i) sequentially enabling access to the second data bus to transfer data to each transceiver from adjacent memory locations in the memory device while disabling access to the second data bus by the other transceiver during a read operation; and (j) enabling access to the first data bus of the microprocessor to transfer data from the transceivers to the microprocessor.

BRIEF DESCRIPTION OF THE DRAWINGS

The objects and advantages of the invention will become more apparent and more readily appreciated from the following detailed description of a presently preferred exemplary embodiment of the invention taken in conjunction with the accompanying drawings, of which.

DETAILED DESCRIPTION OF PREFERRED EMBODIMENTS

An interface in accordance with a presently preferred exemplary embodiment of the invention will be described below with reference to FIGS. 2 and 3. The invention is described as an interface for a 64-bit processor and a 32-bit DRAM; however, it will be recognized by those skilled in the art that the technique of the invention may be used to interface a processor having any bit size to memories of any bit size whereby latching clock cycles may be saved. Thus, the description given herein is for exemplary purposes only and is not intended in any way to limit the scope of the invention. All questions regarding the scope of the invention may be resolved by referring to the appended claims.

Figure 1:
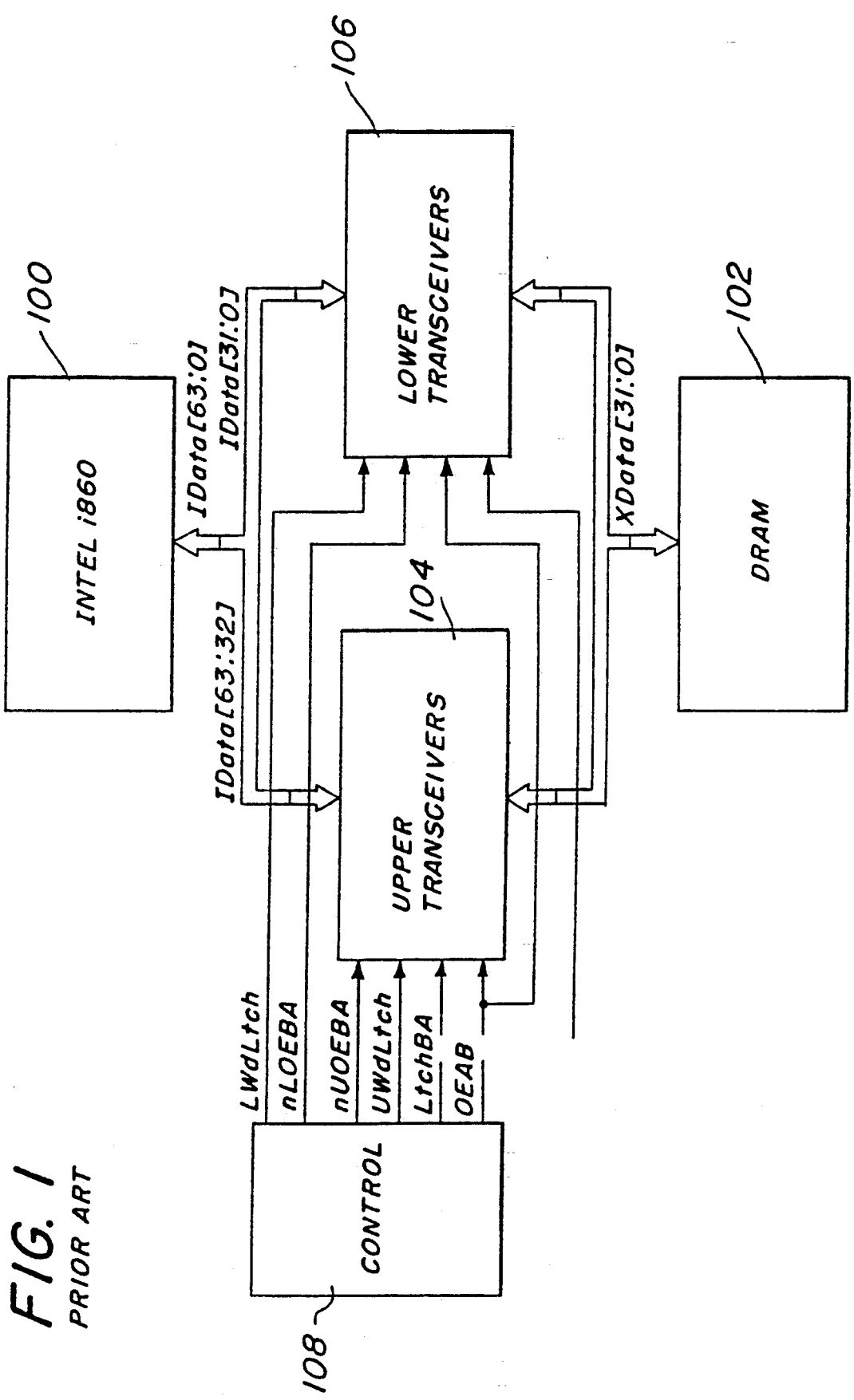
FIG. 1 schematically illustrates a prior art device for interfacing a 64-bit microprocessor with a 32-bit memory.
Figure 2:
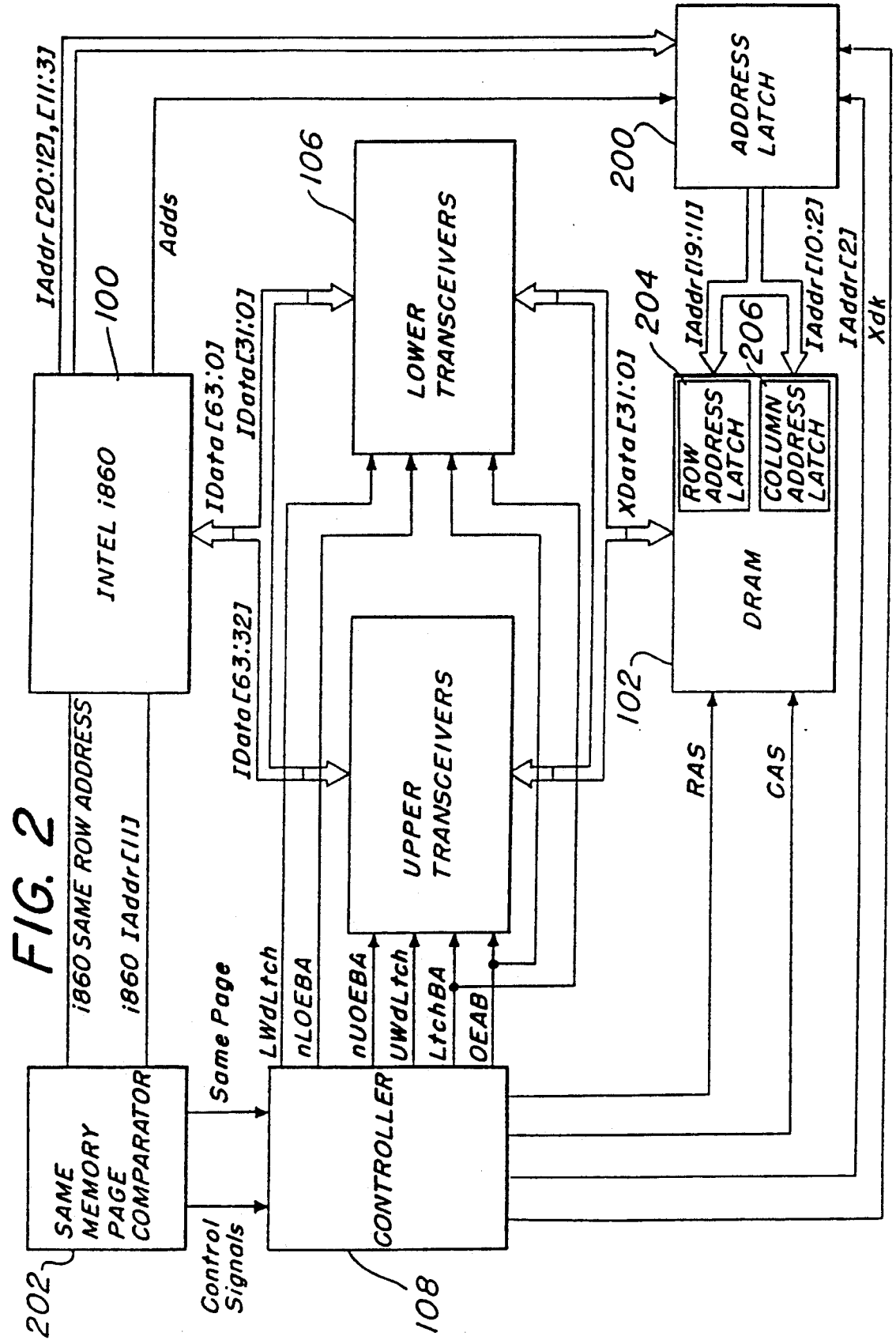
FIG. 2 schematically illustrates a device for interfacing a 64-bit processor with a 32-bit memory in accordance with the invention.

FIG. 2 shows a presently preferred embodiment of the invention. As in the prior art embodiment described with respect to FIG. 1, microprocessor 100 is interfaced with a memory device 102 whose addressable data size is smaller than that of the microprocessor 100. Of course, the memory device 102 may have the same or any different data size as microprocessor 100 so long as excess clock latches may be saved. For example, microprocessor 100 may be a 64-bit INTEL i860 microprocessor and memory device 102 may be a 32-bit DRAM. As in the embodiment of FIG. 1, the interface comprising transceivers 104 and 106 and control device 108 makes the 32-bit DRAM appear to microprocessor 100 as a sequence of 64-bit wide locations by packing two 32-bit words into one 64-bit word for i860 reads from transceivers 104 and 106 and by unpacking one 64-bit word into two 32-bit words of transceivers 104 and 106 for i860 writes.

The interface apparatus of FIG. 2 saves clock cycles during address latching in accordance with the invention as follows. During i860 read and write cycles, controller 108 controls access to data bus XData of the upper and lower transceivers as described above with respect to FIG. 1. An i860-generated address is latched to an address latch 200 for each read and write operation. In accordance with the invention, the controller 108 controls the address latch 200 during relatching of the address to the memory device 102. Such control is exerted after comparing a current address to a previous address to determine whether the i860 asserts an i860 "same page" signal when row address bits 20 through 12 of a current address are the same as those of a previous address, where the row address corresponds to a memory page address in the memory device.

The same memory page comparator 202 receives the i860 same row address signal and i860 Iaddr[11] signal. In a preferred embodiment, the DRAM uses address bits 19 through 2, with its row address portion being bits 19 through 11. Because the i860 typically uses address bits 20 through 3, with its row address portion being bits 20 through 12, the address bus between the i860 and address latch 200 is hard wired to shift the address bits to the right by one to match the address expected by the memory device 102. Although the i860 typically compares bits 20 through 12 to determine the row, the i860 same row address signal would be not completely accurate in such a case to determine whether the DRAM 102 has the same row. Thus, the same memory page comparator 202 ascertains the accuracy by comparing the eleventh bit of the current address with that of the previous address. When the i860 same row signal is asserted and the eleventh bit of the current and previous address match, the same memory page comparator asserts a same page signal.

During relatching of the address from the address latch 200 to the memory device 102, the controller 108 asserts two signals. One is RAS (row address strobe) to latch a row address portion (IAddr[19:11]) in row address latch 204, and the other is CAS (column address strobe) to latch a column address portion (IAddr[10:2]) in column address latch 206. The controller 108 supplies IAddr[2] to complete the column address portion (IAddr[10:2]) for the DRAM 102 since the i860 supplies only IAddr[20:3] and i860 typically uses the address bits 11 through 3 as a column address. However, if the same memory page comparator 202 asserts the same page signal to the controller 108, the controller 108 does not assert a RAS signal to the memory device 102 because the row address latch 110 in the memory device already has the same row address from the previous clock cycles. Thus, the controller 108 saves clock cycles to provide faster access to the memory device thereby avoiding relatching of the row address.

Figure 3:
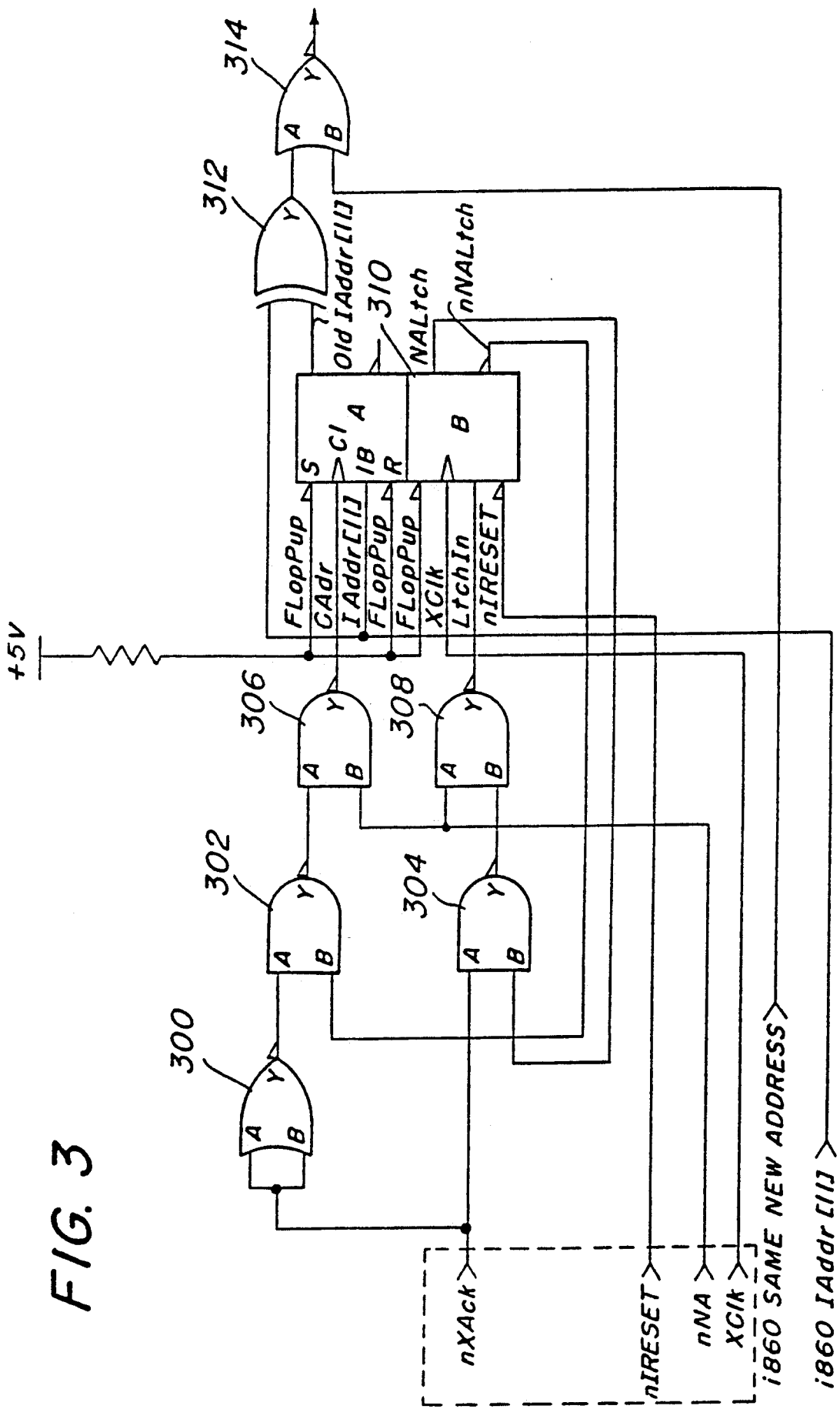
FIG. 3 schematically illustrates an embodiment of the same memory page comparator 202 of FIG. 2.

The same memory page comparator 202 is disclosed in detail in FIG. 3. As shown, the i860 IAddr[11] signal (the eleventh bit of a current address) from the i860 is XORed at XOR gate 312 with OldIAddr[11] (the eleventh bit of a previous address) from an Edge-Triggered, D-Type Flip-Flop, 310A. Since the i860 compares row address bits 20 through 12 and DRAM 102 uses address bits 19 through 11, the eleventh-bit comparison is necessary to ascertain a row address match in the DRAMS 102. The output of this XOR gate 312 is NORed at NOR gate 314 with the i860 same row address signal to output the same page signal. The i860 IAddr[11] signal is then stored in the 310A for the next comparison.

Clocking of the same memory page comparator 202 is controlled by asserting a variety of signals: nXAck is the XBUS acknowledge signal which is asserted upon completion of all XBUS cycles. For read cycles, nXAck is asserted when valid data is present on the i860's data bus. For write cycles, nXAck is asserted when the memory device 102 has accepted the data. nNA is the next address input signal. The controller asserts nNA when it is ready to accept the next address from the i860 processor even before nXAck is asserted. That is, the next address may be accepted before the current cycle ends. nIRESET is the inverted i860 RESET signal. RESET is used to initialize the i860 processor. XClk is a 33.33MHZ, TTL compatible, system clock in the preferred embodiment. All control is referenced to this clock.

Clocking of the same memory page comparator 202 is implemented as follows: The clock input of the flip-flop 310A is CAdr which is generated by NAND gate 306. CAdr is asserted on the negative-going edge of nNA from the controller 108 in order to clock in the eleventh bit in the flip-flop 310A. If nNA is not asserted for a particular cycle, CAdr is asserted on the negative-going edge of nXAck. CAdr is not asserted until the IAddr[2]/OldAddr[2] comparison of the present cycle is complete. The following equation is implemented by NOR gate 300 and NAND gates 302 and 306:

$$CAdr = \sim nXAck \cdot nNALtch + \sim nNA$$

Flip-flop 310B is clocked by XClk and used to remember if nNA is asserted for a given cycle. LtchIn latches in nNa in flip-flop 310B. NALtch is asserted on the rising edge of XClk when nNA is already asserted. NALtch is asynchronously cleared when nIRESET is low or nXAck is asserted on the rising edge of XClk. The following equation is implemented by NAND gates 308 and 304:

$$LtchIn = nXAck \cdot NALtch + \sim nNA$$

To achieve the best result, it is important to write data strings at consecutive addresses in the memory device 102. A 64-bit data string is most likely written at two consecutive 32-bit addresses unless the second 32-bit address crosses a memory page boundary. In fact, if the interface were designed to write a series of 64-bit data strings at consecutive addresses in the memory device as much as possible, write operations and later read operations of these strings would be more efficient. As long as the data strings do not cross a memory page boundary, their row address is the same. By avoiding relatching of the row address, the current invention saves 5 clock cycles for each read or write operation. By not relatching both row and column addresses to the memory device, the cycle savings thus may be as high as 50%. Therefore, the more consecutive memory accesses the interface manages, the faster the interface becomes.

Although a single exemplary embodiment of the invention was described in detail above, those skilled in the art will readily appreciate that many additional modifications are possible in the exemplary embodiment without materially departing from the novel teachings and advantages of this invention. For example, the invention may be used with microprocessors and memories of different sizes and with larger or smaller pages. Accordingly, all such modifications are intended to be included within the scope of the invention as defined in the following claims.

What is claimed is:

1. Apparatus for interfacing a microprocessor to a memory device, comprising:
   means for latching a current address from said microprocessor to said memory device;
   a first address bus coupling said microprocessor to said address latching means;
   a second address bus coupling said address latching means to said memory device, said second address bus shifting a row address portion of said current address by a predetermined number of bits so that said row address portion of said current address matches a row address portion of an address of said memory device, said predetermined number of bits by which said row address portion is shifted defining unused address bits;
   a same memory-page comparator responsive to a first input signal from said microprocessor indicating that said row address portion of said current address is the same as a row address portion of a previous address before a shift by said second address bus and a second input signal from said microprocessor including at least said unused address bits of said row address portion of said current address after said shift for determining whether said current address and said previous address are on a same memory page of said memory device based upon a comparison of said unused address bits of said row address portion of said previous address, said unused address bits of said row address portion of said current address, and said first input signal; and
   a controller responsive to a result of said comparison from the same memory-page comparator for controlling access by said second address bus to said memory device so as to inhibit relatching of said current address latched by said address latching means.

2. Apparatus according to claim 1 wherein said microprocessor processes data having a first bit length and said memory device has an addressable data size of a second bit length which is less than said first bit length, said apparatus for interfacing further comprising:
   means for holding data having said second bit length during transfer between said microprocessor and said memory device;
   a first data bus of said first bit length coupling said data holding means to the microprocessor; and
   a second data bus of said second bit length coupling said data holding means to the memory device;
   wherein said determining means includes means responsive to said microprocessor for controlling access to said first and second data buses during the transfer of data of said first bit length between said microprocessor and said memory device.

3. Apparatus according to claim 2 wherein said first bit length is 64-bits and said second bit length is 32-bits.

4. Apparatus according to claim 2 wherein said memory device is a 32-bit dynamic random access memory.

5. Apparatus according to claim 2 wherein said same memory-page comparator performs the steps of:
   (a) comparing said unused address bits of said row address portion of said previous address and said unused address bits of said row address portion of said current address;
   (b) comparing said first input signal with a result of the comparison in step (a);
   (c) generating a same page signal if said current address is on the same memory page as said previous address based upon results of said steps (a) and (b);
   (d) storing said unused address bits of said row address portion of said current address for a next comparison.

6. Apparatus according to claim 5 wherein said controller during a microprocessor write operation performs the steps of:
   (a) when said same page-signal from said same memory-page comparator is not asserted, sending a row address strobe signal to said memory device, the row address strobe signal allowing said memory device to relatch a row address portion of an address in said address latching means, the row address portion of the relatched address specifying a memory page in the memory device;
   (b) sending a column address strobe signal to said memory device, said column address strobe signal allowing said memory device to relatch a column address portion of the current address in said address latching means;
   (c) enabling data access of said microprocessor and allowing the data of said first bit length to be transferred from said microprocessor to said data holding means, said data holding means comprising first and second transceivers of said second bit length respectively holding an upper half of the data of the second bit length and a lower half of the data of the second bit length;
   (d) enabling access to the first transceiver over said second data bus and disabling access to the second transceiver over said second data bus;
   (e) writing the first transceiver's content at the relatched row and column addressed to the memory device;
   (f) disabling access to the first transceiver over said second data bus and enabling access to the second transceiver over said second data bus; and
   (g) writing the second transceiver's content to an address of said memory device that is adjacent to the relatched row and column addresses in the memory device.

7. Apparatus according to claim 5 wherein said controller during a microprocessor read operation performs the steps of:
   (a) when said same-page signal from said same memory-page comparator is not asserted, sending a row address strobe signal to said memory device, the row address strobe signal allowing said memory device to relatch a row address portion of an address in said address latching means, the row address portion of the relatched address specifying a memory-page in said memory device;
   (b) sending a column address strobe signal to said memory device, said column address strobe signal allowing said memory device to relatch a column address portion of the address in said address latching means;
   (c) transferring data of the second bit length at the relatched address in said memory device to a first transceiver of said data holding means by enabling access to said second data bus and disabling access by a second transceiver to said second data bus, said first and second transceivers having said second bit length and respectively holding an upper half of the data of the second bit length and a lower half of the data of the second bit length;
- (d) enabling access to said second data bus by said second transceiver and disabling access to said second data bus by said first transceiver and transferring data of the second bit length from an address that is adjacent to the relatched address in said memory device to said second transceiver; and
- (e) enabling access to both said first and second transceivers via said first data bus to simultaneously transfer data of the first bit length from the first and second transceivers to the microprocessor.

8. Apparatus according to claim 1 wherein said address latching means is responsive to an address and address strobe signal from said microprocessor for latching said current address for each read and write operation of said microprocessor.

9. Apparatus according to claim 1 wherein bits 12 through 20 of said current address from said microprocessor represent a row address of said memory device and bits 3 through 11 of said current address from said microprocessor represent a column address of said memory device, and said memory device uses bits 11 through 19 for a row address and bits 2 through 10 for a column address thereof, said second first address bus being hardwired to shift a current address latched by said address latching means by one bit so as to match row address bits of at least said row address of said current address to row address bits of said row address of said memory device.

10. Apparatus for providing high speed access to a 32-bit memory device by a 64-bit microprocessor comprising:
- first and second transceivers for holding 64-bit data during transfer between said microprocessor and said memory device, said first transceiver holding an upper 32 bits of a 64-bit data string and said second transceiver holding a lower 32 bits of said 64-bit data string;
- a first data bus connecting said transceivers with said microprocessor;
- a second data bus connecting said transceivers with said memory device;
- an address latch responsive to an address and an address strobe signal from said microprocessor for latching the address for each read and write operation;
- a first address bus connecting the microprocessor with the address latch;
- a second address bus connecting the address latch with the memory device, said second address bus shifting a row address portion of a current address by a predetermined number of bits so that said row address portion of said current address matches a row address portion of an address of said memory device, said predetermined number of bits by which said row address portion is shifted defining unused address bits;
- a same memory-page comparator responsive to a first input signal from said microprocessor indicating that said row address portion of said current address is the same as a row address portion of a previous address before a shift by said second address bus and a second input signal from said microprocessor including at least said unused address bits of said row address portion of said current address after said shift by said second address but for determining whether said current address and said previous address are on a same memory page of said memory device by performing the steps of
  - (a) comparing said unused address bits of said row address portion of said previous address and said unused address bits of said row address portion of said current address,
  - (b) comparing said first input signal with a result of the comparison in step (a),
  - (c) generating a same page signal if said current address is on the same memory page as said previous address based upon results of said steps (a) and (b), and
  - (d) storing said unused address bits of said row address portion of said current address for a next comparison; and
- a controller responsive to the same page signal for controlling access to the first and second data bus during data transfer, said controller also controlling access to said second address but for independently latching a row address portion and column address portion of an address in the memory device based upon the same page signal so as to inhibit relatching of a currently latched row address.

11. Apparatus according to claim 10 wherein said controller during a microprocessor write operation performs the steps of:
- (a) when the same page signal from said same memory-page comparator is not asserted, sending a row address strobe signal to said memory device, the row address strobe signal allowing said memory device to relatch a row address portion of an address in said address latch, the row address portion of the relatched address specifying a memory page in the memory device;
- (b) sending a column address strobe signal to said memory device, said column address strobe signal allowing said memory device to relatch a column address portion of said current address in said address latch;
- (c) enabling data access of said microprocessor and allowing 64-bit data to be transferred from said microprocessor to said first and second transceivers;
- (d) enabling access to the first transceiver over said second data bus and disabling access to the second transceiver over said second data bus;
- (e) writing the first transceiver's content at the relatched row and column addresses to the memory device;
- (f) disabling access to the first transceiver over said second data bus and enabling access to the second transceiver over said second data bus; and
- (g) writing the second transceiver's content to an address of said memory device that is adjacent to the relatched row and column addresses in the memory device.

12. Apparatus according to claim 10 wherein said controller during a microprocessor read operation performs the steps of:
- (a) when said same page signal from said same memory-page comparator is not asserted, sending a row address strobe signal to said memory device, the row address strobe signal allowing said memory device to relatch a row address portion of an address in said address latch, the row address portion of the relatched address specifying a memory page in said memory device;

(b) sending a column address strobe signal to the memory device, the column address strobe signal allowing the memory device to relatch a column address portion of the address in said address latch;

(c) transferring 32-bit data at the relatched address in said memory device to said first transceiver by enabling access to said second data bus and disabling access by said second transceiver to said second data bus;

(d) enabling access to said second data bus by said second transceiver and disabling access to said second data bus by said first transceiver and transferring 32-bit data from an address that is adjacent to the relatched address in said memory device to said second transceiver; and (e) enabling access to both said first and second transceivers via said first data bus to simultaneously transfer the 64-bit data from the first and second transceivers to the microprocessor.

13. Method for writing data to and reading data from a memory device for processing by a microprocessor, said method comprising the steps of:

(a) enabling access to a first data bus connecting said microprocessor to first and second transceivers, said transceivers holding data during transfer between said microprocessor and said memory device;

(b) respectively transferring data from the microprocessor to the first and second transceivers;

(c) shifting a current address in said microprocessor by a predetermined number of bits;

(d) sending said current address shifted in said step (c) to said memory device, said predetermined number of bits by which a row address portion is shifted defining unused address bits;

(e) determining if said current address after said shifting in step (c) is within a memory page which is accessed in a previous bus cycle based upon an input signal indicating that said row address portion of said current address is the same as a row address portion of a previous address from the microprocessor before a shift in said step (c) and a comparison of said unused address bits of said row address portion of said current address after said shift and said unused address bits of said row address portion of said previous address after said shift;

(f) generating a same row signal if the current address and the previous address are on a same memory page;

(g) storing said unused address bits of said row address portion of said current address for a next execution of the determining step (e);

(h) inhibiting relatching of said row address portion of said current address when said same row signal is generated during said generating step (f);

(i) sequentially enabling access to a second data bus by one of the first and second transceivers to the memory device to write data stored in each of said transceivers at adjacent memory locations while enabling access to the second data bus by the other of said transceivers during a write operation;

(j) repeating steps (c) through (h);

(k) sequentially enabling access to said second data bus by one of the first and second transceivers to transfer data from adjacent memory locations in the memory device while disabling access to the second data bus by the other of said transceivers during a read operation; and (l) enabling access to said first data bus of the microprocessor to transfer data from the transceivers to the microprocessor.

* * * * *